United States Patent [19]

Gulotty et al.

[11] Patent Number: 5,037,935

[45] Date of Patent: Aug. 6, 1991

[54] THERMOPLASTIC COMPOSITIONS WITH NONLINEAR OPTICAL ACTIVITY

[75] Inventors: Robert J. Gulotty; Stephen E. Bales, both of Midland, Mich.

[73] Assignee: The Dow Chemical Company, Midland, Mich.

[21] Appl. No.: 535,210

[22] Filed: Jun. 8, 1990

[51] Int. Cl.$^5$ ............................................ C08G 63/195
[52] U.S. Cl. ..................... 528/125; 528/128; 528/149; 528/150; 528/151; 528/153; 528/154; 528/176; 528/193; 528/194; 528/204; 528/272
[58] Field of Search ............... 528/125, 128, 149, 150, 528/151, 153, 154, 176, 193, 194, 204, 272

[56] References Cited

U.S. PATENT DOCUMENTS 4,692,636  9/1987  Wang .................................. 307/427
4,871,830  10/1989  Mark et al. ........................ 528/192

*Primary Examiner*—John Kight, III
*Assistant Examiner*—Sam A. Acquah

[57] ABSTRACT

This invention provides thermoplastic polymeric materials comprising polycarbonate and polyestercarbonate resins and oriented polymeric compositions thereof which exhibit nonlinear optical properties.

2 Claims, No Drawings

THERMOPLASTIC COMPOSITIONS WITH NONLINEAR OPTICAL ACTIVITY

FIELD OF THE INVENTION

The present invention relates to the use of thermoplastic polymeric materials for the preparation of novel nonlinear optical (NLO) materials which can be useful in nonlinear optical devices. More particularly, the present invention relates to NLO media incorporating polycarbonate and polyestercarbonate resins.

BACKGROUND OF THE INVENTION

Information may be more rapidly processed and transmitted using optical as opposed to electrical signals. Optical signals can be used to enhance the performance of electronics processors. For example, electronic wires interconnecting integrated circuits (ICs) can be replaced with optical interconnects and the information processed with IC driven electro-optic modulators. Optical signals in fiber optic communications can be encoded on the optical carrier using electro-optic (EO) modulators. In both of the processes above, nonlinear optical materials with second-order nonlinear optical activity are necessary to affect the modulation of light signal.

Nonlinear optical materials can also be used for frequency conversion of laser light. Such a conversion is desirable in many applications. For example, optical memory media are presently read using 830 nm light from diode lasers. The 830 nm light wavelength limits the spot sizes which can be read and hence the density of data stored on the optical memory media. Similarly, in fiber optic communications, light wavelengths of 1.3 $\mu$m or 1.5 pm are desirable due to the low transmission losses of glass fiber at those wavelengths. However, those wavelengths are too long for detection by Si based detectors. It is desirable to frequency double the 1.3 pm or 1.5 $\mu$m wavelengths to 650 nm or 750 nm wavelengths where Si based detectors could be used.

Nonlinear optical materials which have been used in electro-optic devices have in general been inorganic single crystals such as lithium niobate ($LiNbO_3$) or potassium dihydrogen phosphate (KDP). More recently, nonlinear optical materials based on organic molecules, and in particular polar aromatic organic molecules have been developed.

The nonlinear optical properties of organic and polymeric materials has been the subject of numerous symposia. The International Society for Optical Engineering (SPIE) has sponsored a number of NLO related symposia, e.g. the symposium "Nonlinear Optical Properties of Organic Materials II" on Aug. 10–11, 1989 (SPIE Proceedings Series, Vol. 1147, 1990). Similarly, the Materials Research Society has sponsored a symposium titled, "Nonlinear Optical Properties of Polymers" on Dec. 1–3, 1987 (Materials Research Society Symposium Proceedings, Vol. 109, 1988).

The organic based materials have a number of potential advantages over the inorganic and semiconductor based materials. First, the organic materials have higher NLO activity on a molecular basis. Organic crystals of 2-methyl-4-nitroaniline have been shown to have a higher nonlinear optical activity than that of $LiNbO_3$. Second, the nonlinear optical activity of the organic materials is related to the polarization of the electronic states of the organic molecules, offering the potential of very fast switching times in EO devices. The time response of the system to a light field is on the order of 10 to 100 femtoseconds. In contrast, a large fraction of the polarizability in the inorganic crystals is due to nuclear motions of the ions in the crystal lattice, slowing the time-response of the materials. In addition, the low dielectric constant of the organic materials (e.g. 2–5 Debye at 1 MHz) compared to the inorganic materials (e.g. 30 Debye at 1 MHz) enables higher EO modulator frequencies to be achieved for a given power consumption. Third, the organic materials can be easily fabricated into integrated device structures when used in polymer form.

EP 218,938 and U.S Pat. No.4,859,876 have used an approach of incorporating NLO active molecules into amorphous polymer host matrices for NLO media. The NLO molecules are incorporated into the host by blending. Such doped polymers have the advantages of being easily fabricated into thin films suitable for integrated optical devices. The media contain organic molecules (dopants) with nonlinear optical activity with the advantages discussed above. These films must be oriented to achieve a non-centrosymmetric alignment of the NLO chromophores. Such alignment is usually achieved by the application of an electric field across the film thickness while the temperature of the polymeric blend is near its glass transition temperature ($T_g$). The polymer is then cooled with the field on to lock the oriented molecules in place. EP 218,938 discloses a number of polymer host materials, including epoxies, and many types of molecules which have NLO activity including azo dyes such as Disperse Red 1. It is known that an NLO active material such as azo dye Disperse Red 1, (4,-[N-ethyl-N-(2-hydroxyethyl]amino-4-nitro azobenzene), may be incorporated into a host by simply blending the azo dye in a thermoplastic material such as poly(methylmethacrylate), as described in Applied Physics Letters 49(5), 4 (1986) and U.S. Pat. No. 4,859,876.

While the doped polymer approach offers some advantages over organic and inorganic crystals, the approach has a number of problems. First, the stability of the NLO activity over time of such materials has been shown to be poor. A problem associated with a polymer with NLO properties produced by simply blending NLO molecules into a host polymer is that these polymer materials lack orientational stability. There is significant molecular relaxation or reorientation within a short period of time resulting in a loss of NLO properties. For example, as reported by Hampsch et al., Macromolecules 1988, 21, 528–350, the NLO activity of a polymer with NLO molecules blended therein decreases dramatically over a period of days at room temperature.

U.S. Pat. No. 4,792,208 discloses an article containing an NLO medium which employs various sulfonyl moieties as electron acceptor moieties in polar aligned non-centrosymmetric molecular dipoles. U.S. Pat. Nos. 4,869,847 and 4,859,876 disclose the use of polycarbonate resins as the host material for blended NLO compositions. The use of polycarbonate as a matrix for dye aggregates is disclosed by Wang, U.S. Pat. No. 4,692,636.

In addition, the NLO dopants in the blending polymeric media plasticize the polymer host matrix, lowering the polymer glass transition temperature ($T_g$). Lowering the polymer $T_g$ has the effect of lowering the temperature stability of the electrically oriented NLO material or NLO medium. Near the $T_g$, segments of the polymer become mobile and the NLO active dopant molecules which were oriented electrically undergo orientational relaxation. Once orientational relaxation has occurred, the NLO medium exhibits no NLO activity.

A third problem with the doped polymers is the poor solubility of the NLO chromophore in the host matrix. Finally, the NLO chromophores tend to aggregate at relatively low doping levels (e.g. 5-20 percent w/v). Such aggregates scatter light and reduce the transparency of the waveguides to unacceptable levels.

Another disadvantage is that the polymer employed may have a low glass transition temperature, lack sufficient tensile strength, or other desirable properties for optical devices.

There is a continuing effort to develop new nonlinear optical polymers with increased nonlinear optical susceptibilities and enhanced stability of nonlinear optical effects. It would be highly desirable to have organic polymeric materials, particularly polymeric materials based on polycarbonate and polyestercarbonate resins, with larger second and third order nonlinear optical properties than presently used organic electrooptic materials.

The present invention solves the problems identified above with doped polymers, while maintaining the advantages listed for the doped polymers and organic based NLO materials.

It is an object of this invention to make optically transparent polymers incorporating organic molecular structures which exhibit NLO activity upon orientation. It is an additional object of this invention that the polymers comprising the NLO medium have a relatively high glass transition temperature. A high glass transition temperature will correlate with high temperature stability of the NLO medium. The incorporation of the NLO active structures into the polymer backbone has a number of advantages. High levels of NLO chromophore functionalization can be achieved without increasing the scattering losses of waveguides fabricated from the polymer. The addition of the groups which add to the NLO activity of the polymer do not plasticize the polymer and lower the polymer $T_g$. In fact, such modifications can raise the polymer $T_g$. That the NLO chromophore is inherent to the polymer backbone increase the orientational stability of the NLO chromophores in the fabricated NLO waveguides, reducing the temporal decay of the NLO activity with time.

SUMMARY OF THE INVENTION

The instant invention relates to amorphous polymers which exhibit second and /or third order nonlinear optical activity following external field orientation. Among these polymers are bisphenol A polycarbonate and polyestercarbonate polymers and copolymers of bisphenol A and diols or diacids with enhanced NLO activity. These polymers exhibit NLO activity based on the dipolar aromatic character of the backbone of the polymer. The oriented polymeric compositions of the instant invention do not depend upon oriented dopant molecules or large pendent chromophores as do many prior art materials. For this reason the oriented polymeric compositions of this invention retain their NLO activity for much longer times than prior art materials. The materials of this invention also have generally higher $T_g$ values than plasticized prior art materials, and thus are useful in higher temperature applications than prior art materials.

The phrase "oriented polymeric composition" as used herein indicates a polymeric composition which has been oriented by the application of an external field according to the methods disclosed herein, or which has been oriented by some other method, such that the polymeric composition exhibits nonlinear optical properties. In a preferred embodiment there is enhanced second-order nonlinear optical activity.

In one embodiment the invention is a nonlinear optical medium comprising an oriented polymeric composition having repeating units corresponding to the formula:

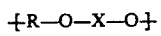

wherein R is the divalent nucleus of an aliphatic or aromatic diol and X corresponds to the formula:

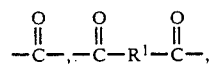

or a mixture thereof wherein $R^1$ is the divalent nucleus of an aliphatic or aromatic dicarboxylic acid.

These NLO media exhibit unexpectedly high and persistent levels of second-order NLO activity when prepared according to the procedures of this invention.

A preferred embodiment of the present invention relates to novel polymeric materials particularly suited for the preparation of NLO media. These are a polymeric composition comprising polymers containing recurring units corresponding to the formula

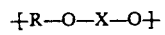

wherein R is derived from a mixture of bisphenol A and 3,3'-dinitrobisphenol A and X is a mixture of

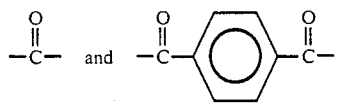

or mixture of

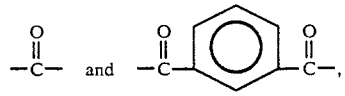

and a polymeric composition comprising polymers containing recurring units corresponding to the formula

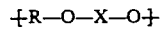

wherein R is derived from a mixture of 4,4'-thiodiphenol and 3,3'-dinitrobisphenol A, and X corresponds to the formula:

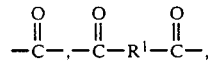

or a mixture thereof wherein $R^1$ is the divalent nucleus of an aliphatic or aromatic dicarboxylic acid.

DETAILED DESCRIPTION OF THE INVENTION

The polymers used to prepare the NLO media of this invention are polycarbonates, prepared by the reaction of a diol with a carbonate precursor, and polyestercarbonates, prepared by reacting a diol with a carbonate precursor and a dicarboxylic acid or a diacid halide.

The diols used to prepare the polymers for the NLO media of this invention can be any aliphatic, alicyclic, heterocyclic or aromatic dihydroxy compound which has two hydroxyl groups capable of reacting with carboxylic acids and/or carbonate precursors. In general, the terms aliphatic and aromatic as used herein are meant to be inclusive of alicyclic and heterocyclic.

Typical of some of the dihydroxy diaryl compounds that are advantageously employed are bisphenols such as bis(4-hydroxyphenyl)methane, 1,1 -bis(4-hydroxyphenyl)-1-phenylehtane, 2,2-bis(4-hydroxyphenyl)propane (also commonly known as bisphenol A), 2,2-bis(4-hydroxy-3-methylphenyl)propane, 4,4-bis(4 -hydroxyphenyl)heptane, 2,2-bis(4-hydroxy-3,5-dichlorophenyl)propane, 2,2-bis(4-hydroxy-3,5-dibromophenyl)propane; dihydroxyphenyl ethers such as bis(4-hydroxyphenyl)ether, bis(3,5-dichloro-4-hydroxyphenyl)ether; dihydroxy biphenyls such as 4,4'dihydroxybiphenyl, 3,3'-dichloro-4,4'-dihydroxy biphenyl, 2,2',6,6'-tetrabromo-3,3',5,5'-tetramethyl-4,4'-dihydroxybiphenyl; dihydroxy aryl sulfones such as bis(4-hydroxyphenyl)sulfone, bis(3,5-dimethyl-4-hydroxyphenyl)sulfone; and dihydroxy biphenyl sulfides and sulfoxides such as bis(4-hydroxyphenyl)sulfide and bis(4-hydroxyphenyl)sulfoxide: or mixtures thereof.

The preferred dihydroxy diaryl compounds are the bisphenol compounds, especially the 4,4'-bisphenols optionally substituted by a halogen, nitro group, or a $C_{1-6}$ hydrocarbon radical and biphenyl compounds. Exemplary of such diaryl dihydroxy compounds are 2,2-bis(4-hydroxyphenyl)propane, 1,1-bis(4-hydroxyphenyl)-1-phenylethane, 2,2',6,6'-tetrabromo-3,3',5,5'-tetramethyl-4,4'-dihydroxybiphenyl, 2,2-bis(4-hydroxy-3,5-dichlorophenyl)propane, 2,2-bis(4-hydroxy-3,5-dibromophenyl)propane, 4,4'-dihydroxybiphenyl and bis(4-hydroxyphenyl)sulfide also referred to as 4,4'-thiodiphenol.

Suitable diols are aliphatic diols including straight-chain and branched aliphatic diols such as ethylene glycol, propylene glycol, butylene glycol, and neopentyl glycol: alicyclic diols such as trans-1,4 -cyclohexanediol, cis-1,4-cyclohexanediol, trans-1,4 -cyclohexanedimethanol, cis-1,4-cyclohexanedimethanol, trans-1,3-cyclohexanedimethanol: and alkyl-, alkoxy-, or halogen-substituted derivatives of the above said alicyclic diols such as trans-1,4-(1-methyl)cyclohexanediol and trans-1,4-(1-chloro)cyclohexanediol.

Suitable aromatic diols include hydroquinone, resorcinol, 2,6-naphthalenediol and 1,6-naphthalenediol. A variety of additional aromatic diols are also available and are disclosed in U.S. Pat. Nos. 2,999,835; 3,028,365 and 3,153,008, the relevant parts of which are incorporated herein by reference.

In a preferred embodiment diols suitable for use in the polymeric materials of the present invention can be represented by the formula

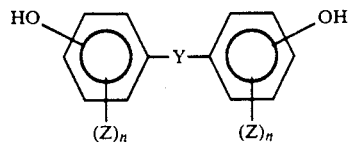

wherein Y is a single bond,

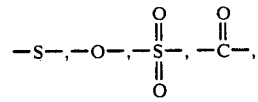

or a divalent hydrocarbyl or inertly substituted hydrocarbyl of up to 15 carbon atoms: each Z is independently selected from the group consisting of —H, —NO$_2$, —CI, —Br, —OCH$_3$, —SCH$_3$, —CN, —NO or a divalent hydrocarbyl or inertly substituted hydrocarbyl of up to 6 carbon atoms; and n is 4.

The carbonate precursor may be either a carbonyl halide, a diaryl carbonate or a bishaloformate. The carbonyl halides include carbonyl bromide, carbonyl chloride and mixtures thereof. The bishaloformates suitable for use include the bishaloformates of dihydric phenols such as bischloroformates of 2,2-bis(4-hydroxyphenyl)propane, 2,2-bis(4-hydroxy-3,5-dichlorophenyl)propane, 2,2-bis(4-hydroxy-3,5-dichlorphenyl) propane, hydroquinone and the like or bishaloformates of glycols such as ethylene glycol and the like. While all of the above described carbonate precursors are useful, carbonyl chloride, also known as phosgene, is preferred.

Suitable dicarboxylic acid compounds can be aliphatic, alicyclic, heterocyclic, aromatic, or mixtures thereof. Hydroxy acids may also be used in small quantities in the preparation of the polymers of this invention.

Suitable aliphatic dibasic acids are those derived from straight-chain paraffin hydrocarbons such as oxalic, malonic, dimethyl malonic, succinic, glutaric, adipic, pimelic, subaric, azelaic, and sebacic acid. Also included are the halogen-substituted aliphatic dibasic acids. Aliphatic carboxylic acids containing heteroatoms and their aliphatic chain, such as thiodiglycollic or diglycollic acid may also be used. Also useful are such unsaturated acids as maleic or fumaric.

Suitable alicyclic dicarboxylic acids include trans-1,4-cyclohexanedicarboxylic acid, cis-1,4-cyclohexanedicarboxylic acid, and 1,3-cyclohexanedicarboxylic acids: and alkyl-, alkoxy-, or halogen-substituted derivatives of the above said alicyclic dicarboxylic acids.

Aromatic dicarboxylic acids suitable for use in the making of polymers of the present invention include terephthalic acid, 4,4'-biphenyldicarboxylic acid, 4,4'-triphenyldicarboxylic acid, 2,6-naphthalenedicarboxylic acid, biphenylether-4,4'-dicarboxylic acid, diphenoxyethane-4,4'-dicarboxylic acid, diphenoxybutane4,4'-dicarboxylic acid, biphenylethane-4,4'-dicarboxylic acid, isophthalic acid, biphenyl-ether-3,3'-dicarboxylic acid, diphenoxyethane-3,3'-dicarboxylic acid, biphenylethane-3,3'-dicarboxylic acid, naphthalene-1,6dicarboxylic acid and 1,5-anthraquinone-dicarboxylic acid: and alkyl-, alkoxy-, nitro-, or halogen-substituted derivatives of the above said aromatic dicarboxylic acids such as chloro terephthalic acid, dichloro terephthalic acid, bromo terephthalic acid, methyl terephthalic acid, dimethyl terephthalic acid, ethyl terephthalic acid, methoxy terephthalic acid and ethoxy terephthalic acid.

Examples of hydroxy acids are hydroxy glutaric acid, mandelic acid, the various isomers of hydroxy benzoic acid, hydroxy biphenyl carboxylic acid, and the like.

The mono- and diacid chloride derivatives of the above-mentioned dicarboxylic acids are also suitable for preparing the polymers of the present invention. Further examples of suitable dicarboxylic acid compounds or hydroxy carboxylic acid compounds are given in U.S. Pat. Nos. 3,637,595: 3,975,487; and 4,118,372, the relevant parts of which are herein incorporated by reference. When the diaryl dicarboxylic acids are used in combination with other suitable dicarboxylic acids, preferred are the above-mentioned aromatic carboxylic acids.

Methods of producing polycarbonates and polyestercarbonates are well-known in the prior art. Such methods are suitable for use in forming the polymeric compositions of the present invention. Suitable methods for preparing polycarbonate resins are set forth in U.S. Pat. Nos. 3,248,414; 3,153,008; 3,215,668; 3,187,065; 3,028,365; 2,999,846; 2,964,974; 2,970,137; 1,991,273; and 2,999,835; all of which are incorporated herein by reference. Similarly, methods of producing polyestercarbonates are known in the prior art. Exemplary of methods by which polyestercarbonates may be produced are those methods described in U.S. Pat. Nos. 3,169,121; 4,287,787; 4,156,069; 4,260,731; 4,330,662; 4,360,656; 4,374,973; 4,255,556; 4,388,455; 4,355,150 4,194,038 4,238,596 4,238,597 4,252,939; 4,369,303; and 4,105,633; and articles by Kolesnikov et al. published in Vysokomol Soedin as B9, 49 (1967); A9, 1012 (1967); A9, 1520 (1967); and A10, 145 (1968); all of which are incorporated herein by reference. Generally the aforementioned processes involve the reaction of dihydroxyl containing compounds with phosgene or other suitable carbonate precursor or with a mixture phosgene or other carbonate precursor and a dicarboxylic acid, acid anhydride or acid halide.

The prior art process which may be used to prepare the compositions of the present invention generally employ a chain stopping agent (terminator) during the polymerization step to control molecular weight. The concentration of the chain stopping agent in the reaction mixture has a direct effect on both the molecular weight and the viscosity of the polycarbonate or polyestercarbonate prepared. Chain stopping agents are monofunctional compounds which react with a carbonate precursor site on the backbone of the polymer and by such reaction ends the propagation of the polymer at such a point. Preferable chain stopping agents include monofunctional compounds that are reactive with the carbonate precursor employed in forming the polycarbonate or polyestercarbonate prepared. Examples of desirable chain stopping agents include monofunctional aromatic alcohols, thiols, and amines. Preferred chain stopping agents are the aromatic alcohols and the aliphatic alcohols.

The polymers used in the NLO media of this invention can be fabricated into films using solution casting techniques known to those skilled in the art. 5-15 weight percent of the polymer is dissolved in a volatile solvent and passed through 0.2-1.0 μm filters to remove dust particles. The polymers can be cast from these solutions into films in a number of ways, as described in the examples below. In general, the solutions can either be cast onto large glass plates using a "Doctor-blade" technique or simply poured into dishes with flat plate glass bottoms. These glass plates or dishes are then covered with other glass plates or watch glasses to reduce the evaporation rate of the solvent for optimum optical quality of the fabricated films. The thickness of the films is measured using a micrometer and a typical result is a thickness of 10–100 μm. Films may also be fabricated by dip-coating or spin-coating techniques.

The films fabricated from the polymers of this invention are oriented by electric field poling using either parallel plate poling or corona discharge poling techniques known to those skilled in the art. In the case of parallel plate poling, typically a film is sandwiched between two glass slabs with electrically conductive and transparent Indium-Tin-Oxide (ITO) coatings. The sandwiched film is heated to near the polymer $T_g$ and a voltage is applied to the electrodes resulting in an electric field of 0.1–0.7 MV/cm across the film. The sample is held for 10 minutes or more and cooled to room temperature with the field on. In the case of corona discharge poling a similar procedure is used except the films are placed on a microscope slide on a resistively heated block. A tungsten wire is then positioned 1 cm above the sample. The corona poling technique is described further by M. A. Mortazavi et al., J. Opt. Soc. Am. B 6(1989).

The oriented film fabricated from the polymers of this invention can be characterized for their NLO activity by a Maker Fringe Rotation Second Harmonic Generation Technique which is well known to those skilled in the art. See for example, Singer et al., Appl. Phys. Lett. 49, (1986) 248–250.

DETAILED DESCRIPTION OF PREFERRED EMBODIMENTS

The following examples are give to further illustrate the invention as construed by the inventors. However, these examples are not to be interpreted as limiting the scope of the invention in any way. Unless stated otherwise, all parts and percentages are given by weight.

EXAMPLE 1

This example describes the synthesis of a bisphenol-A (BA)/3,3'-dinitrobisphenol A (DNBA) copolycarbonate having a BA/DNBA molar ratio of 1/1.

A five-liter (L) flask equipped with a thermometer, condenser, nitrogen and phosgene inlets and a paddle was charged with 64.08 g (0.281 mole) BA, 89.31 g (0.281 mole) DNBA, 0.42 g (0.0028 mole) p-tertbutylphenol, 115.6 g (1.461 mole) pyridine, and 1.4 L methylene chloride ($CH_2Cl_2$).

The contents of the flask were stirred at 200 rpm under a slow nitrogen purge and 58.6 g (0.592 mole) of phosgene was added to the flask over 38 minutes while maintaining the contents of the flask at a temperature between 16° C. and 25° C. After the addition of phosgene, 5 mL of methanol and 0.2 L of 3N hydrochloric acid were added to the contents of the flask. The contents of the flask were stirred for an additional 15 minutes and then poured into a four liter separatory funnel. The $CH_2Cl_2$ phase containing the polycarbonate was separated and washed with 0.42 L of 0.5 N hydrochloric acid.

The washed $CH_2Cl_2$ phase was separated and passed through a column of macroporous cation ion exchange resin, and the polycarbonate was then isolated by adding one volume of the $CH_2Cl_2$ phase to 3.3 volumes hexane and 0.67 volumes acetone in an explosion resistant blender.

The precipitated product was filtered and then dried in a vacuum oven at 120° C. for 48 hours. The resulting product weighed 141.7 g, had an inherent viscosity of 0.513 dL/g as measured in $CH_2Cl_2$ at 25° C. and a concentration of 0.5 g/dL, had a glass transition temperature of 161° C. as measured by differential scanning calorimetry at a 20° C./minute heating rate, and had a BA/DNBA molar ratio of 1/1 as determined by nuclear magnetic resonance and infrared spectroscopy.

EXAMPLE 2

This example describes the preparation of a polyestercarbonate using bisphenol A (BA), 3,3'-dinitrobisphenol A (DNBA), terephthaloyl chloride and phosgene and having a BA/DNBA molar ratio of 1/1 and a terephthalate/carbonate molar ratio of 1/1.

A three liter flask equipped as in the last preparation was charged with 41.26 g (0.181) mole BA, 57.53 g (0.181 mole) DNBA, 74.4 g (0.941 mole) pyridine and 1 L of $CH_2CL_2$. The contents of the flask were stirred at 250 rpm and 36.75 g (0.181 mole) terephthaloyl chloride was added to the flask over two minutes while maintaining the temperature in the range of 17° C. to 23° C. The contents of the flask were stirred an additional 10 minutes, 0.54 g (.0036 mole) p-tertbutylphenol was added, and then 19.5 g (0.197 mole) phosgene is added to the flask over a thirty-one minute period while maintaining the temperature between 17° C. and 23° C. Following the phosgene addition, the contents of the flask were washed and the polyestercarbonate product was isolated according to the procedures of the above-mentioned preparation.

Following vacuum oven drying, the product weighed 112.4 g, had an inherent viscosity of 0.730 dL/g, had a glass transition temperature of 188° C., and had a BA/DNBA molar ratio of 1/1 and a terephthalate/carbonate molar ratio of 1/1 as determined by the analytical procedures described hereinbefore.

EXAMPLE 3

Bisphenol A polycarbonate having an inherent viscosity of 0.514 dL/g was prepared according to the general procedure of Example 1. 7 g of this polymer was placed in a jar and dissolved in 70 mL of dichloromethane. The sample was placed on a shaker bath for 1 hr to facilitate the dissolution of the polymer. The solution was filtered through 8 micrometer and 1.2 micrometer filters.

The polymer solution was poured into a "Doctor-blade" apparatus on an 8×10×1/16 inch thick glass plate. The spacing between the "Doctor-blade" and the glass plate was 1 mm and the apparatus was drawn across the glass plate in a direction opposite the spacing leaving a flat viscous film. Four stacks of 2 stainless steel flat washers (1/16 inch thick) were positioned on the glass plate around the film at the corners of the plate. A second glass plate similar to the first plate was placed over the sample on the washer stacks. The purpose of the second plate was to reduce the evaporation rate of the solvent from the cast film and to keep dust from falling on the film as it dried. The sample was dried at room temperature for 3 days. The films were removed from the glass plate by peeling. Addition of a drop of water to the film edge facilitated the film removal. The films were oven dried for 6 hrs at 100° C. and vacuum oven dried at 110° C. overnight.

A 1 inch×2 inch sample was cut from the film using a razor blade. The thickness of the film was measured to be 42 micrometers using a Metric Systems Eng Corp thin film thickness gauge. The sample was sandwiched between two transparent electrodes. The electrodes were 1×3×⅛ inch glass with an electrically conductive and transparent coating of Indium-Tin-Oxide (ITO) patterned as a strip ⅜×2.25 inches in area. The sample was placed between two aluminum blocks on a hot plate and a voltage of 2%50 V was applied across the electrodes of the sample, yielding an applied electric field of approximately 0.607 MV/cm. The temperature of the sample was raised to 135° C. and maintained for 15 minutes. The sample temperature was lowered to 23° C. and the voltage was turned off.

The electrodes were removed from the sample and the sample was mounted on a rotation stage. 1064 nm light pulses from a Quanta-Ray DCR-2A $Nd^{+3}$/Yag laser were focused onto the sample using a 20 inch focal length spherical lens and 532 nm light created in the sample by second harmonic generation was collected using a Philips XP2020Q photomultiplier tube in a refrigerated housing. The photomultiplier signal was input to a Stanford Research Systems SR 250 Gated Integrator and Boxcar Averager. The signal from the 532 nm light was measured as a function of angle and the data was iteratively fit to determine the second-order nonlinear optical coefficient, $d_{33}$ using equations described in Singer et al., Appl. Phys. Lett. 49, (1986) 248–250. A y-cut quartz crystal, $d_{11} = 1.2 \times 10^{-9}$ esu, was used as a reference to obtain absolute numbers.

A $d_{33}$ value of $0.16 \times 10^{-9}$ esu was obtained for the 50 micrometer thick sample assuming indices of refraction of 1.5929 and 1.5677 at 532 nm and 1064 nm.

EXAMPLE 4

Bisphenol A polycarbonate with an inherent viscosity of 0.575 dL/g, prepared according to the general procedure of Example 1, was compression molded at 260° C. into a sheet approximately 497 micrometers thick and 4×4 inches in area.

A 1×2 inch sample was cut from the sheet. The sample was sandwiched between electrodes and electrically oriented according to the procedure described in Example 3. A film of Total Plastics #2355-2 Teflon-FEP Tape with an adhesive backing was attached to one of the ITO glass electrodes which sandwiched the sample. An electric field of 0.127 MV/cm was applied to the sample and a maximum poling temperature of 130° C. was used.

A $d_{33}$ value of $0.11 \times 10^{-9}$ esu was measured as described in Example 3.

EXAMPLE 5

A 1×2 inch sample of LEXAN TM (General Electric Trademark) polycarbonate sheet (70 micrometers thick) was sandwiched between 5.4 mil thick polished Al sheet electrodes and electrically oriented according to the procedure described in Example 3 except that the sample was heated in an oven during the poling process. An electric field of 0.403 MV/cm was applied to the sample and a maximum poling temperature of 157° C. for 14 minutes was used.

A $d_{33}$ value of $0.09 \times 10^{-9}$ esu was measured as described in Example 3.

EXAMPLE 6

3.45 g of the copolycarbonate prepared in Example 1 was dissolved in 40 mL of dichloromethane and placed in a sonication bath. The solution was filtered through 8 micron pore size and 1.2 micrometer pore size filters. The solution was cast into film using the "Doctorblade" apparatus as described in Example 3 with a 500 micrometer spacing. The film was dried for 2 hours in a laminar flow hood and then oven dried by raising the sample temperature from 20° C. to 166° C. and then let stand in the oven with the door closed until the temperature reached 20° C.

The sample was electrically oriented according to Example 3. An electric field of 0.395 MV/cm was applied to the sample and a maximum poling temperature of 176° C. was used.

A $d_{33}$ value of $1.48 \times 10^{-9}$ esu was measured as described in Example 3.

EXAMPLE 7

An alternating copolycarbonate was prepared by the reaction of 4,4'-dihydroxybenzophenone and the bischloroformate of bisphenol A as in the general procedure of Example 1. 10.4 g of this polymer, having an inherent viscosity of 0.591 dL/g, was dissolved in 69 mL of dichloromethane, filtered, cast into film, and electrically oriented according to Example 3. An electric field of 0.331 MV/cm was applied to the sample and a maximum poling temperature of 161° C. was used.

A $d_{33}$ value of $0.175 \times 10^{-9}$ esu was measured as described in Example 3.

EXAMPLE 8

A bisphenol A/4,4'-sulfonyldiphenol (1/1) copolycarbonate having an inherent viscosity of 0.735 dL/g was prepared according to the general procedure of Example 1. This polymer was dissolved in dichloromethane, filtered, cast into film, and electrically oriented according to Example 3. An electric field of 0.352 MV/cm was applied to the 28 micrometer sample and a maximum poling temperature of 194° C. was used.

A $d_{33}$ value of $0.971 \times 10^{-9}$ esu was measured as described in Example 3.

EXAMPLE 9

A bisphenol A/4,4'-thiodiphenol (1/1) copolycarbonate having an inherent viscosity of 0.538 dL/g was prepared according to the general procedure of Example 1. This polymer was dissolved in dichloromethane, and filtered as described in Example 1. The sample was cast by pouring the casting solution into a 2 inch diameter pipe sitting on plate glass and then dried and electrically oriented according to Example 3 except an oven was used to heat the sample during the electrical poling process. An electric field of 0.291 MV/cm was applied to the 176 micrometer thick sample and a maximum poling temperature of 141° C. was used.

A $d_{33}$ value of $0.971 \times 10^{-9}$ esu was measured as described in Example 3.

EXAMPLE 10

A 4,4'-thiodiphenol/3,3'-dinitrobisphenol A (1/1) copolycarbonate was prepared according to the general procedure of Example 1. This polymer was dissolved in 1,1,2,2-tetrachloroethane and filtered as described in Example 1. The film was cast in a plate glass bottomed evaporation dish covered with a watch glass. The films were dried in an oven at 100° C. overnight and in a vacuum oven at 110° C. for three days. The sample was electrically oriented as in Example 3. An electric field of 0.55 MV/cm was applied to the 37 micrometer thick sample and a maximum poling temperature of 140° C. was used.

A $d_{33}$ value of $0.58 \times 10^{-9}$ esu was measured as described in Example 3 except only two data points were used in the equations to determine the $d_{33}$ value. The data points were the second harmonic light intensity data at 45 degrees for the sample and 0 degrees for the quartz reference crystal.

EXAMPLE 11

A bisphenol A/2-nitroresorcinol(1/1) copolycarbonate having an inherent viscosity of 0.257 dL/g was prepared according to the general procedure of Example 1. The polymer was dissolved in dichloromethane, filtered, cast into film, and electrically oriented according to Example 3 except an oven was used to heat the sample during the poling process. An electric field of 0.35 MV/cm was applied to the 50 micrometer thick sample and a maximum poling temperature of 145° C. was used.

A $d_{33}$ value of $0.07 \times 10^{-9}$ esu was measured as described in Example 10.

EXAMPLE 12

The polyestercarbonate prepared in Example 2 was dissolved in dichloromethane, filtered, cast into film, and electrically oriented according to Example 1. An electric field of 0.34 MV/cm was applied to the 29.8 micrometer sample and a maximum poling temperature of 190° C. was used.

A $d_{33}$ value of $0.93 \times 10^{-9}$ esu was measured as described in Example 3.

EXAMPLE 13

A bisphenol A/3,3'dinitrobisphenol A (1/1) copolycarbonate having an inherent viscosity of 0.501 dL/g was prepared according to the general procedure of Example 1. The polymer was dissolved in dichloromethane and filtered according to Example 1. A microscope slide was dipped into the bottle of polymer solution and slowly withdrawn. Polymer was removed from one side by dissolution in dichloromethane. The sample was air dried for 1 hr and oven dried at 110° C. for 2 hrs and vacuum oven dried for 2 hrs at 110° C. The sample was determined to be 1.26 micrometer thick by optical transmission measurements in the 400–800 nm region according to methodology described by J. C. Manifacier et al., J. Phys. E: Scientific Instruments 9 (1976) 1002–1004. The sample was placed on a heater block and oriented by corona discharge poling with an applied voltage of 10 KV. The current measured in series with the sample was 10 microamps and the maximum temperature of poling was 162° C. The corona poling apparatus was comprised of a Tungsten Scanning Tunneling Microscope Tip suspended ¾ inch above the sample heater block (¾×¾×2 inches). The sample rests on the heater block with the film side up and is covered with a microscope cover slip (1×2 inch).

A $d_{33}$ value of $8.7 \times 10^{-9}$ esu was measured as described in Example 3.

EXAMPLE 14

The copolycarbonate of Example 11 was dissolved in dichloromethane, filtered, and cast into a film according to Example 3. The polymer was placed on a microscope slide and corona poled as described in Example 13. The sample was determined to be 73.5 micrometer thick as described in Example 3. The sample was oriented by corona discharge poling with an applied voltage of 8 KV. The technique of corona poling is familiar to those skilled in the art, see for example R. B. Comizzoli, J. Electrochem. Soc.: Solid State Science and Technology 134 (1987), 424–429. The current measured in series with the sample was 6 microamps and the maximum temperature of poling was 145° C. for 15 minutes. The corona poling apparatus was as described in Example 13 except no cover slip was placed over the sample.

A $d_{33}$ value of $0.3 \times 10^{-9}$ esu was measured as described in Example 3.

EXAMPLE 15

The persistence of NLO activity for the copolycarbonate of Example 6 was measured for a sample prepared and electrically oriented according to Example 6. The data below summarizes the results of measurements of the $d_{33}$ value as described in Example 3 as a function of time after poling. The sample was maintained at room temperature after poling.

| Time (days) | $d_{33} \times 10^{-9}$ esu |
| --- | --- |
| 1 | 1.5 |
| 26 | 1.05 |
| 47 | 0.9 |
| 130 | 0.85 |
| 250 | 0.7 |
| 300 | 0.8 |
| 640 | 0.8 |

The data above demonstrates the high and persistent NLO activity of the copolycarbonate of Example 6.

What is claimed is:

1. A polymeric composition comprising polymers containing recurring units corresponding to the formula:

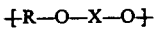

wherein R is derived from a mixture of bisphenol A and 3,3'-dinitrobisphenol A and X is a mixture of

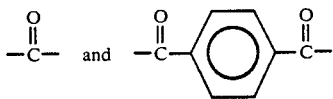

or a mixture of

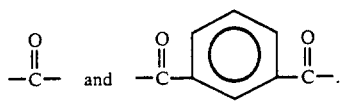

2. A polymeric composition comprising polymers containing recurring units corresponding to the formula:

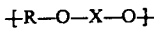

wherein R is derived from a mixture of 4,4'-thiodiphenol and 3,3'-dinitrobisphenol A, and X corresponds to the formula:

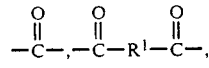

or a mixture thereof, wherein $R^1$ is the divalent nucleus of an aliphatic or aromatic dicarboxylic acid.

* * * * *